US006777669B2

(12) United States Patent
Fitzgerald

(10) Patent No.: US 6,777,669 B2
(45) Date of Patent: Aug. 17, 2004

(54) SCALE MONITOR

(75) Inventor: John Barry Fitzgerald, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 122 days.

(21) Appl. No.: 09/965,072

(22) Filed: Sep. 27, 2001

(65) Prior Publication Data

US 2002/0070337 A1 Jun. 13, 2002

(30) Foreign Application Priority Data

Oct. 5, 2000 (GB) .............................................. 0024330

(51) Int. Cl.$^7$ ................................................ G01V 5/06
(52) U.S. Cl. ...................................... 250/256; 356/72
(58) Field of Search ................................. 250/256, 261, 250/227.11, 227.14, 227.24, 227.27, 262, 269.1, 252.1; 359/143; 356/72, 328

(56) References Cited

U.S. PATENT DOCUMENTS

| | | | | |
|---|---|---|---|---|
| 3,688,115 A | | 8/1972 | Antkiw ...................... 250/71.5 |
| 4,090,072 A | * | 5/1978 | Michaelis et al. .......... 376/159 |
| 4,412,130 A | | 10/1983 | Winters ....................... 250/260 |
| 4,504,438 A | * | 3/1985 | Levy et al. ................. 376/156 |
| 4,507,553 A | * | 3/1985 | Oliver et al. ............. 250/269.6 |
| 4,717,825 A | | 1/1988 | Smith, Jr. et al. ........... 250/256 |
| 4,856,584 A | | 8/1989 | Seidner ....................... 166/250 |
| 5,038,033 A | | 8/1991 | Carroll et al. .............. 250/256 |
| 5,077,471 A | * | 12/1991 | Smith et al. ................ 250/260 |
| 5,180,917 A | * | 1/1993 | Wraight ...................... 250/374 |
| 5,539,788 A | * | 7/1996 | Ruddy et al. ............... 376/159 |
| 5,578,820 A | | 11/1996 | Gadeken et al. ............ 250/256 |
| 5,828,067 A | * | 10/1998 | Rushbrooke et al. .. 250/370.11 |
| 6,037,585 A | | 3/2000 | Gadeken ..................... 250/262 |
| 6,268,911 B1 | * | 7/2001 | Tubel et al. ................... 356/72 |
| 6,281,489 B1 | * | 8/2001 | Tubel et al. ........... 250/227.14 |
| 6,531,694 B2 | * | 3/2003 | Tubel et al. ........... 250/227.14 |

FOREIGN PATENT DOCUMENTS

| | | | |
|---|---|---|---|
| EP | 0 081 314 A2 | 11/1982 | ............ G01V/5/00 |
| EP | 0 442 813 A2 | 2/1991 | ............ E21B/47/00 |
| WO | WO 00/68652 | 5/2000 | ............. G01F/1/74 |
| WO | WO 01/31328 A1 | 10/2000 | ........... G01N/29/02 |
| WO | WO 01/31329 A1 | 10/2000 | ........... G01N/29/02 |

OTHER PUBLICATIONS

Chemicals in the Oil Industry (1985), pp. 0036S.1–45, A. L. Smith, "Radioactive Scale Formation".

Naturwissenschaften 27 (1939) II, pp. 11–15, O. Hahn et al., "On the Identification and Properties of the Alkaline Earth Metals Produced by the Irradiation of Uranium with Neutrons" [English Translation].

Spwla (1976), pp. 1–21, G. Marett, et al., "Shaly Sand Evaluation Using Gamma Ray Spectrometry, Applied to the North Sea Jurassic".

* cited by examiner

Primary Examiner—Constantine Hannaher
Assistant Examiner—Otilia Gabor
(74) Attorney, Agent, or Firm—Willliam L. Wang; William B. Batzer; John J. Ryberg

(57) ABSTRACT

A method of analysing scale at a location in a hydrocarbon well flow system comprises the steps of: using an in situ gamma-ray detector to obtain a gamma-ray spectrum from said scale, and spectroscopically analysing said spectrum to determine the abundances of radioactive isotopes in said scale.

22 Claims, 11 Drawing Sheets

SCALE MONITOR

FIELD OF THE INVENTION

The present invention relates to a device and a method for monitoring scale, and particularly scale in a hydrocarbon well flow system.

BACKGROUND OF THE INVENTION

The formation of scale is a well-known problem in the oil and gas industry. Scales can develop when (relatively high) formation fluid temperatures and pressures are reduced during fluid extraction, the temperature and pressure reduction encouraging the precipitation from solution of scale-forming species. The scale deposits can cause undesirable constrictions or blockages in well production tubing and in the well formations themselves.

Particularly problematic scale deposits are those containing barium salts, generally observed as $BaSO_4$. These are much more difficult to remove than, for example, calcium carbonate scale. Thus it is desirable to be able to detect the build-up of barium scale as early as possible.

In addition to barium, formation water generally contains naturally occurring radium in solution leached from the formation. Different isotopic species of radium may be present in the formation as members of both the uranium (see FIG. 1) and thorium (see FIG. 2) radioactive decay series. As a relatively soluble member of the decay chains, radium is taken into solution in formation water and carried into the borehole. Because radium and barium chemistries are very similar, radium is co-precipitated when barite scale is deposited.

Therefore, scales often contain radioactive material. This means that contaminated completion equipment must be dealt with and disposed of according to radiation safety legislation. However, forewarning of scale deposition, and analysis of the properties of the deposit formed, allows appropriate prevention or removal strategies to be adopted and radiation safety procedures to be planned effectively.

U.S. Pat. No. 6,037,585 describes a method of locating downhole scale and determining the flux of gamma-rays emitted therefrom. This information is then used to correct downhole gamma-ray measurements so that activity due to artificially introduced tracer isotopes can be identified. The method uses wireline logging equipment incorporating a spectroscopic gamma-ray tool.

U.S. Pat. No. 5,038,033 describes another method of detecting downhole radioactive deposits and determining the level of radioactivity using wireline logging equipment.

U.S. Pat. No. 4,856,584 relates to a method of inhibiting scale formation in which a gamma-ray detector is used to monitor scale build up.

SUMMARY OF THE INVENTION

The present invention is at least partly based on the realisation that, because the radium isotopes in scale decay into characteristic sequences of daughter products, useful information concerning scale formation can be obtained by determining the abundances of radioactive isotopes in the scale. In particular, one of the daughter products of radium is radon which, being a gas, can escape from some types of scale and therefore have a significant effect on the decay sequences. Also the ratio of $^{228}Ra$ to $^{226}Ra$ significantly affects the character of the scale activity.

In the following, we understand "abundance" to be either relative abundance or absolute abundance. In practice relative abundancy values are generally easier to obtain, and in most of the aspects of the invention discussed below relative abundancy values are as acceptable as absolute values. However, where absolute values are desirable this is mentioned.

Also in the following, by a "gamma-ray spectrum" we mean a measure of the relative intensities or count rates of gamma-rays in a plurality of respective gamma-ray energy ranges. Preferably the spectrum has at least three, and more preferably at least five, discrete ranges. Clearly the more ranges there are in the spectrum, the more spectroscopic detail is revealable. In practice, however, the number of ranges is limited by e.g. the need to provide a robust detector and the need to provide sufficient data channels from the detector.

In a first aspect, the present invention provides a method of analysing scale at a location in a hydrocarbon well flow system, comprising the steps of:

(a) using an in situ gamma-ray detector to obtain a gamma-ray spectrum from the scale, and (b) spectroscopically analysing the spectrum to determine the abundances of radioactive isotopes in the scale.

Preferably, the method further comprises the step of:

(c) repeating steps (a) to (b) to monitor the development of the scale.

Because the abundances are related to the amount and manner of deposition of the scale, determining the abundances and monitoring the development of the scale can provide useful information about the formation of the scale and the behaviour of the environment in which the scale is forming. For example, the relative abundances can be indicative of the chemistry of the fluid from which the scale deposits, and a change in the relative abundances may indicate a change in the chemistry of that fluid. So, if the scale deposits from production water, a change in the relative abundances may indicate an alteration in the relative amounts of sea and formation water in the production water.

Also obtaining the spectrum in situ, and repeating steps (a) and (b) allows continuous observation of the scale. The early stages of scale deposition can then be observed so that appropriate remedial action (e.g. use of scale dissolvers or inhibitors) can be taken before the scale thickens and becomes less responsive to such action. In contrast, conventional wireline logging techniques make only a single measurement of scale radioactivity as the logging tool passes along the well production tubing, so that continuous monitoring is not possible and the early stages of scale deposition are easily missed.

The method may further comprise the step of:

(d) using the abundances to determine the specific activity of the scale. An advantage of determining the specific activity in this way is that it is possible to compensate appropriately for e.g. different scale $^{228}Ra$ to $^{226}Ra$ ratios and the escape of radon from the scale. In contrast, if a conventional determination were made on the basis of only a total count rate (without compensation for e.g. the $^{228}Ra$ to $^{226}Ra$ ratio and radon loss), the specific activity could in some cases be overestimated by more than an order of magnitude.

This can be significant because specific activity determinations are often used to help decide whether e.g. special radiation protection measures need to be adopted for the protection of personnel, and the disposal and/or decontamination of contaminated equipment. Such measures are generally costly and inconvenient, and so they are usually adopted only when necessary. Thus it is clearly desirable to have available the most accurate data possible. The method may further comprise the step of:

(e) using the abundances to determine the permeability of the scale. This makes use of the principle that the abundances are related to the proportion of radon which escapes from the scale, and the proportion of escaped radon is in turn related to the permeability and deposition rate of the scale.

Because different types of scale have characteristic permeabilities, this embodiment of the method can provide information about the type of scale which is being formed. An operator might then be in a better position e.g. to select an appropriate form of scale treatment.

The method may further comprise the step of:

(f) using the abundances to determine the amount of radium originally deposited in the scale, and (g) deriving the quantity of scale from the amount of radium and from the relative concentrations of radium and the other scale components in the fluid from which the scale deposits. In this embodiment of the method more accurate determinations of the quantity of scale are generally obtained if, to the extent that is possible, absolute abundancies are determined at step (b).

Based on the amount of radium originally deposited in the scale, and the relative concentrations of radium and the other scale components (particularly Ba) in the fluid from which the scale deposits, it is then possible to derive the amount of scale. This is a significant improvement over conventional techniques for deriving the amount of scale based on the amount of radium presently located in the scale, because the method of this aspect of the invention takes account of e.g. decreases in radioactivity caused by radon escape from the scale. Without compensation for these decreases, erroneously low values for the amount of scale may be calculated.

Preferably the detector of the method is held stationary.

Preferably the detector is permanently or semi-permanently installed in the hydrocarbon well flow system, e.g. by being fixed to a well borehole externally of the production tubing. An advantage of permanent or semi-permanent installation is that deployment of the detector does not then interfere with the production of hydrocarbons from the well. This is in contrast to conventional wireline logging in which production has to stop as the logging tool passes through the production tubing.

Preferably, in step (a) the spectrum is obtained over a time interval of at least ten minutes. However, the duration of the time interval may be e.g. at least one hour or at least one day. Longer durations provide increased measurement sensitivity, but clearly make the method more time-consuming.

The detector may be installed downhole or above ground, depending on where in the flow system it is desired to monitor the scale formation and/or determine scale characteristics. For example, valve operation can be affected by scaling and so the installation of the detector to monitor scale development at a valve in the flow system may be desirable. A below ground detector may monitor scale development e.g. in the production tubing or in the formation of the hydrocarbon well.

In a second aspect, the present invention provides an apparatus for determining at least one characteristic of scale at a location in a hydrocarbon well flow system, comprising a radiation detector and a signal processor. The radiation detector is adapted to be installed (preferably permanently or semi-permanently) in situ in the system, to obtain (preferably repeatedly) a gamma-ray spectrum from the scale, and to send a measurement signal encoding the spectrum to the signal processor. The signal processor is adapted to receive the measurement signal and configured to analyse spectroscopically the spectrum to determine the abundances of radioactive isotopes in the scale.

Preferably the signal processor is further adapted to determine from the abundances at least one of:

(a) the specific activity of the scale, (b) the permeability of the scale, and (c) the amount of radium originally deposited in the scale and thence derive the quantity of scale from the amount of radium and from the relative concentrations of radium and the other scale components in the fluid from which the scale deposits.

The signal processor may be a programmable computer suitably programmed to perform the above-mentioned determinations. Alternatively the processor may comprise dedicated hardware, based on e.g. ROM, for performing the determinations.

The detector may have protective shielding which is adapted, in use, substantially to prevent radiation arriving at the detector from certain directions.

Preferably the detector is adapted to be held stationary in the hydrocarbon well flow system.

The detector may be adapted to be e.g. mounted to a hydrocarbon well production tubing, or cemented to a hydrocarbon well borehole casing.

The apparatus is, therefore, suitable for performing the method of the first aspect of the invention.

BRIEF DESCRIPTION OF THE DRAWINGS

Specific embodiments of the present invention will now be described with reference to the following drawings in which.

DETAILED DESCRIPTION

Figure 1:
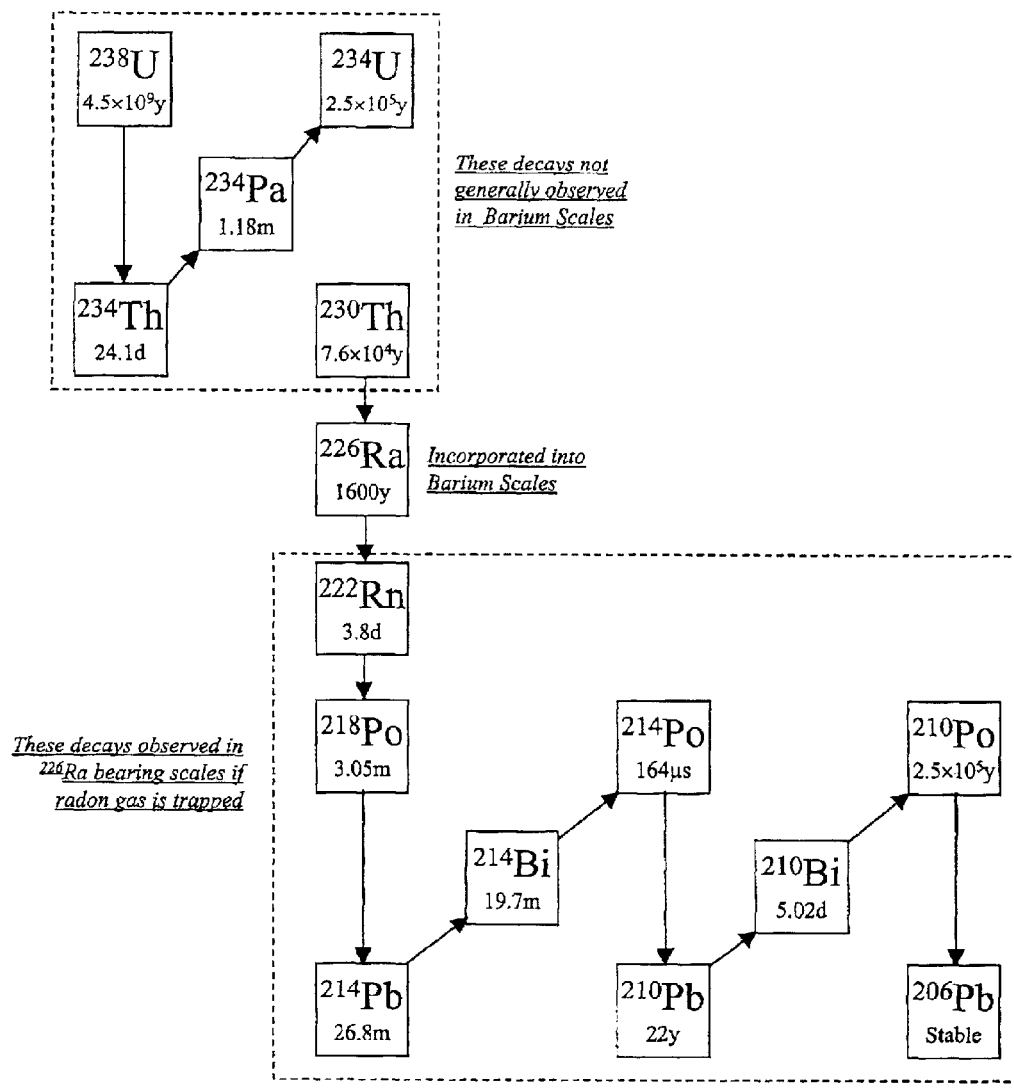
FIG. 1 shows schematically the uranium-338 decay series.
Figure 2:
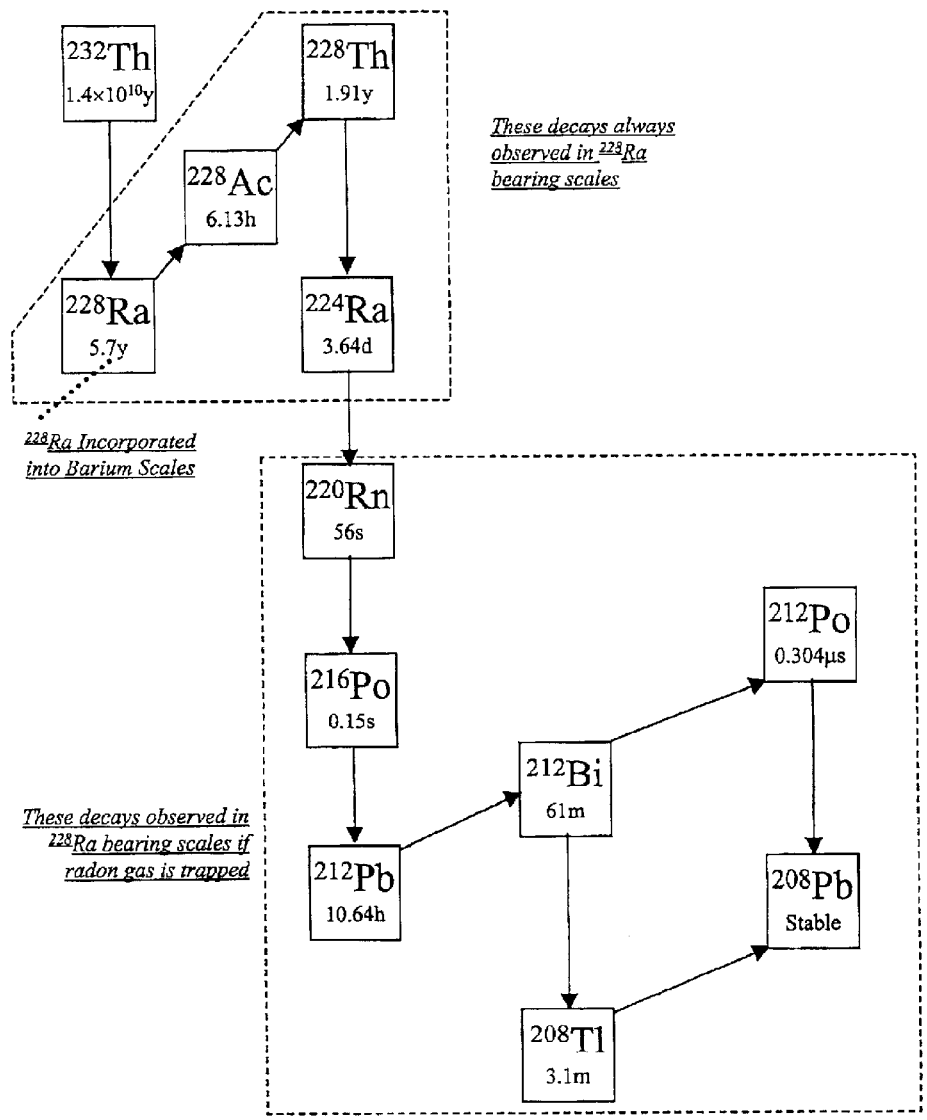
FIG. 2 shows schematically the thorium-232 decay series.

Providing that all daughter products of radium decay are retained within the scale, they will rapidly reach secular radioactive equilibrium, in which the decay rates producing and destroying each isotopic species balance. This is a consequence of the fact that the radioactive half-lives of the daughter products of radium are short compared to their respective progenitor radium isotopes. For the same reason the decay series of $^{238}$U and $^{232}$Th (shown schematically in FIGS. 1 and 2 respectively) are only observable today because the half-lives of $^{238}$U and $^{232}$Th are comparable to the age of the earth.

The gamma-ray spectra emitted by naturally occurring radioactive materials (NORM) in scale (particularly barite scale) are essentially those of radium-226 (from the uranium decay series) and radium-228 (from the thorium decay series) and their respective daughter products. Elements preceding the isotopes of radium in the uranium and thorium decay series are not easily dissolved, and are not observed in most borehole scales. Also, the precursor isotopes to radium-226 and radium-228 within the U and Th decay chains emit relatively weak gamma-ray lines and so, to a good approximation, the spectra of the radium isotopes can be considered equivalent to the U and Th decay series spectra (which are well known to those skilled in the art of oilfield natural gamma-ray logging).

The first decay product of $^{226}$Ra in the uranium decay chain, and the first daughter of $^{224}$Ra in the thorium decay series, is radon. This is a radioactive noble gas. In the case of $^{226}$Ra, it is seen as radon-222 with a half-life of 3.8 days; the lighter isotope radon-220 is formed in the decay of $^{228}$Ra and has a half-life of 55 s. If the scale deposited is permeable, or if the rate of scale deposition is particularly low, then a significant proportion of these radon isotopes can escape the scale, taking with them all subsequent daughter products. The isotopes following radon in the decay chains are not gaseous, and if radon is retained within the scale then its daughter products are seen in secular, or near secular, equilibrium.

Often barite scale is relatively impermeable and has a glassy or ceramic-like structure; this is reflected in the presence of the complete decay series as evidenced by the observation in the gamma-ray spectrum of distinctive gamma-ray lines from Pb and Bi isotopes. However, permeability and deposition rates can vary, which can in turn reduce the abundances in barite scales of the elements below radium in the decay series.

So radium isotopes observed in the uranium and thorium series are generally incorporated in barium scales, but isotopes from radon down may or may not be retained within the deposits. The total gamma-ray spectrum of NORM in borehole scale deposits can therefore be described by four components: (1) the spectrum of $^{226}$Ra; (2) the spectrum of $^{222}$Rn and its daughters in secular equilibrium; (3) the spectrum of $^{228}$Ra, $^{228}$Ac, $^{228}$Th and $^{224}$Ra in secular equilibrium; and (4) the spectrum of $^{220}$Rn and its daughters in secular equilibrium. Components (1) and (2) arise from the uranium decay series, and are denoted $S_U(Ra)$ and $S_U(Rn)$ respectively; likewise, components (3) and (4) which arise from the thorium series are denoted $S_{Th}(Ra)$ and $S_{Th}(Rn)$. If the relative abundances of the first isotope of each component ($^{226}$Ra, $^{222}$Rn, $^{228}$Ra and $^{220}$Rn) are denoted by $a_1$ to $a_4$, then the total spectrum can be written as:

$$S_{Tot}=a_1S_U(Ra)+a_2S_U(Rn)+a_3S_{Th}(Ra)+a_4S_{Th}(Rn).$$

However, the rate of escape of radon gas determines both the ratio $a_1/a_2$ and the ratio $a_3/a_4$. Given either of these ratios, and using the known half-lives of the isotopes involved, one can deduce the other ratio, since, to a very good approximation, the rate of escape of the different isotopes of radon will be the same. Thus, if three of $a_1$ to $a_4$ are obtained (e.g. by measuring the relative intensities of the respective spectra of the respective components), the problem of determining the relative contributions to a given spectrum of the four components can be solved. Spectral stripping techniques (as described e.g. by G. Marett et al., "Shaly Sand Evaluation Using Gamma Ray Spectrometry, Applied to the North Sea Jurassic", Trans. SPWLA Seventeenth Annual Logging Symposium, Jun. 9–12, 1976) to determine the relative intensities of spectra are known to those skilled in the art of natural background logging.

Figure 3:
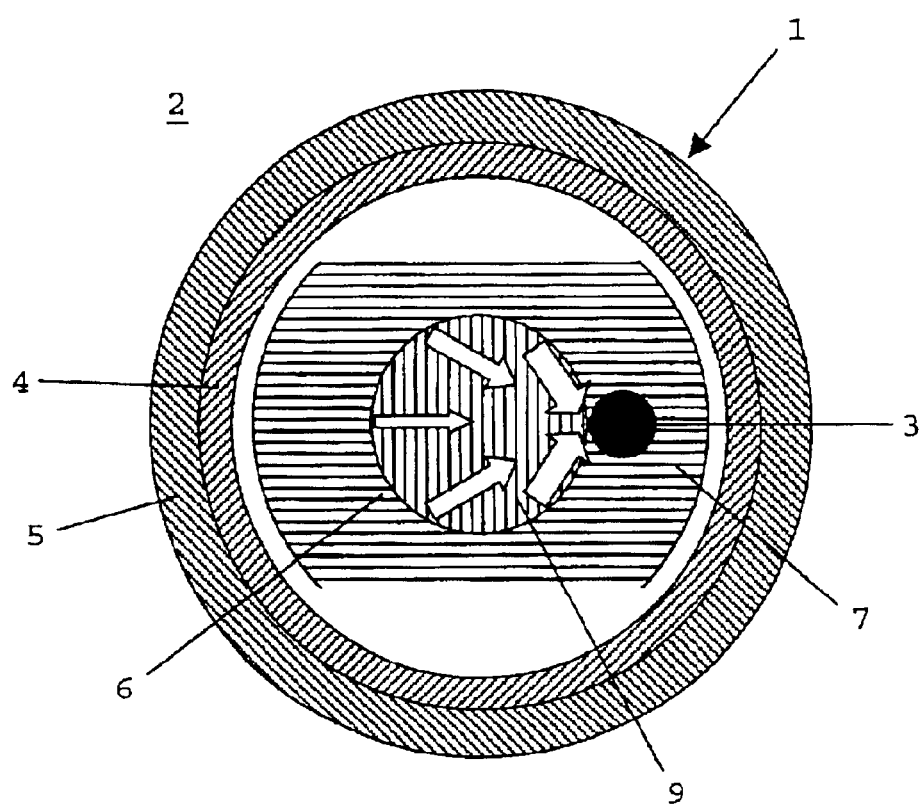
FIG. 3 shows a schematic transverse cross-section through a well borehole to illustrate a first embodiment of the invention.

FIG. 3 shows a schematic transverse cross-section through a well borehole 1 in a subterranean formation 2 and illustrates a first embodiment of the invention. A gamma-ray detector 3 is located within the borehole casing 4 and cement 5 and is mounted adjacent the inner surface of the steel production tubing 6. In this position the detector does not interfere with the flow of produced fluids 9 within the production tubing.

The production tubing has a steel mandrel portion 7 which is positioned radially outwardly of the detector 3. The highly attenuating nature of the steel of the mandrel portion means that the gamma-ray flux reaching the detector is predominantly along the directions indicated schematically by arrows, i.e. from within the production tubing. Gamma-rays from NORM activity in scale e.g. in the formation or casing perforations may be further suppressed by providing heavy metal shielding at appropriate locations. For example tungsten shielding can be provided on the mandrel portion or even outside the casing.

In any event, except when the scale is just starting to form, counts from natural radioactivity within the formation matrix are typically small compared with counts from NORM in deposited scale. However, if necessary, further suppression of gamma-rays from formation natural radioactivity may be accomplished by spectral processing techniques. For example, potassium (after uranium and thorium the third radioisotope which commonly gives rise to natural radioactivity) is not significantly present in scales due to its very high solubility, and spectroscopic analysis can be performed to distinguish potassium activity from scale isotope activity, potassium having a distinctive gamma-ray line at 1.46 MeV. Uranium and thorium formation activity can then be suppressed if the abundances of uranium and thorium in the formation relative to potassium are known.

The detector 3 is typically a NaI(Tl) detector, which is standard in oil field applications. Such detectors are robust and can operate in situ for several years.

Figure 4:
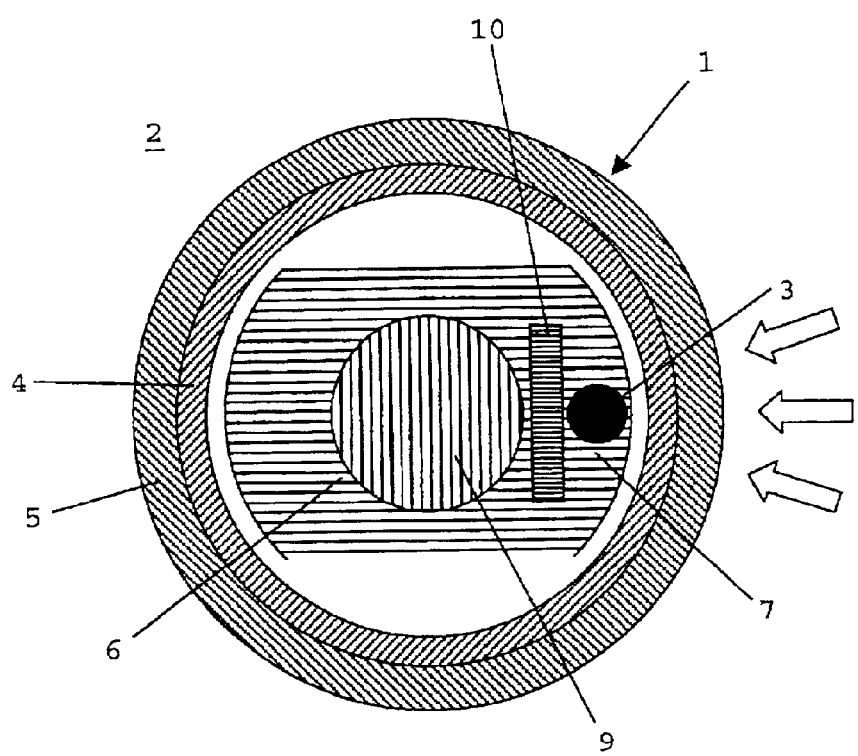
FIG. 4 shows a schematic transverse cross-section through a well borehole to illustrate a second embodiment of the invention.

FIG. 4 shows another schematic transverse cross-section through the well borehole 1 and illustrates a second embodiment in which the detector 3 is mounted towards the outside of the mandrel portion 7 to detect predominantly gamma-rays from NORM in scale deposited in the formation. Heavy metal shielding 10 reduces the gamma-ray flux arriving at the detector from e.g. scale in the production tubing. This embodiment is particularly useful for monitoring the development of scale in the formation adjacent the borehole.

Figure 5:
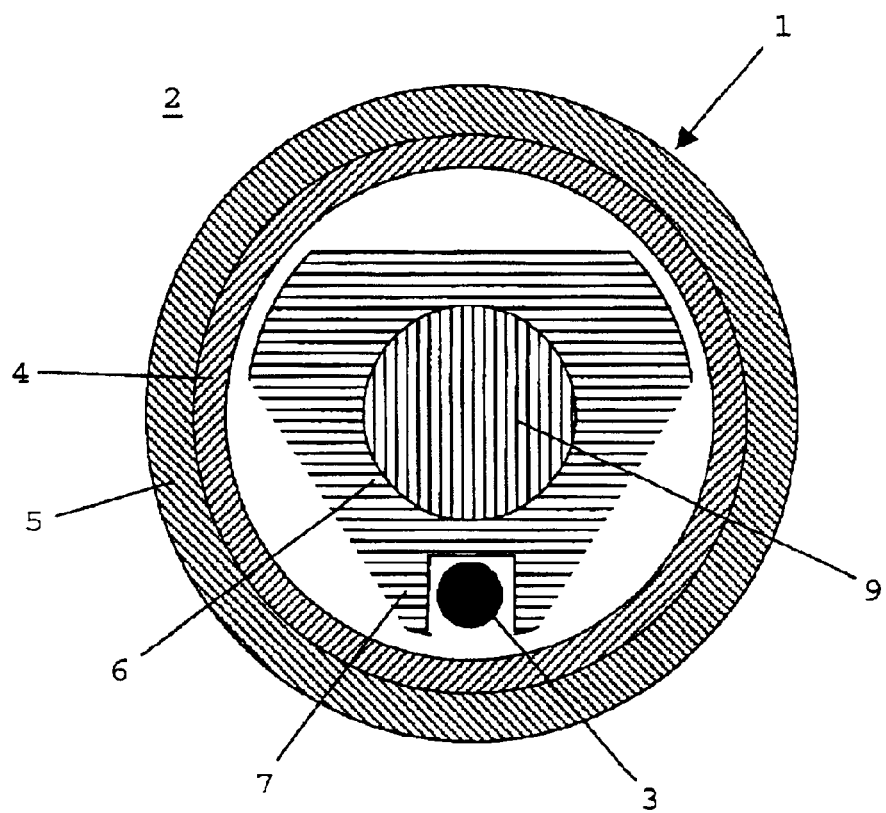
FIG. 5 shows a schematic transverse cross-section through a well borehole to illustrate a third embodiment of the invention.

FIG. 5 shows another schematic longitudinal cross-section through the well borehole 1, and illustrates a third embodiment which differs from the first embodiment essentially only in the shape of the mandrel portion 7.

Figure 6:
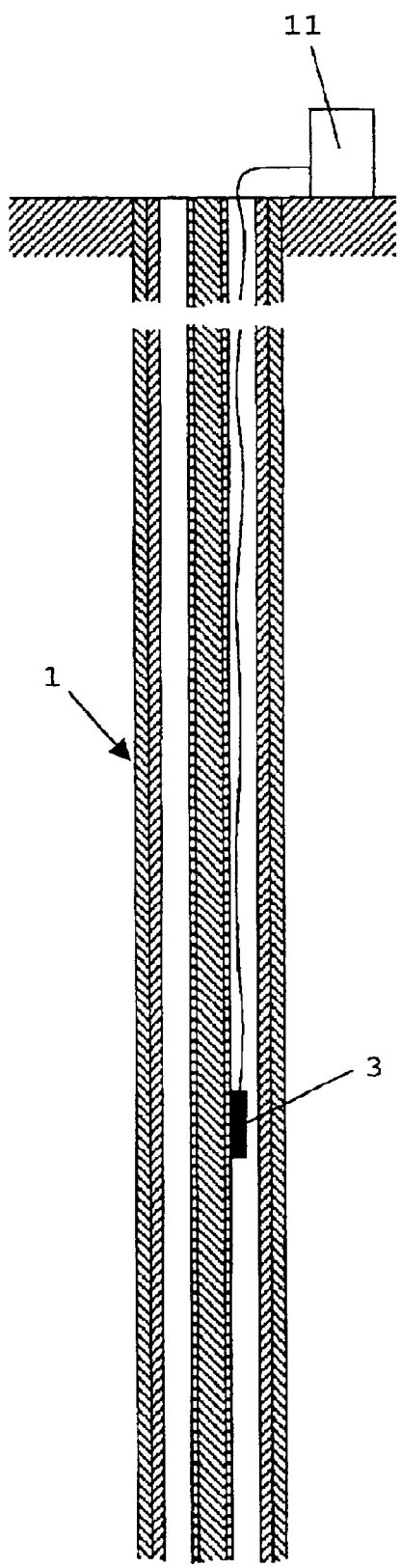
FIG. 6 shows a schematic longitudinal cross-section through the well borehole of FIGS. 3, 4 or 5.

FIG. 6 shows a schematic longitudinal cross-section through the well borehole 1 of FIGS. 3, 4 or 5. Measurement signals from the detector of FIGS. 3, 4 or 5 are conveyed to a processor 11, such as an appropriately programmed computer or a dedicated hardware device, which is located on the surface (although in other embodiments it may be in situ downhole). The signals communicate the total gamma-ray count rate measured by the detector. A plurality of discriminator thresholds are also applied to the measured count rate so that different gamma-ray energies can be discriminated. This allows spectroscopic analysis of the detected gamma-rays to be performed by the processor.

Typical spectra observable for activity from impermeable and permeable production tubing scales detected by the detector of the third embodiment of the invention (shown in FIG. 5) were simulated using the Los Alamos Monte Carlo N-Particle transport code running on a Silicon Graphics computer. For the purposes of the simulation, a 6"×¾" NaI detector crystal was assumed. A larger crystal or side-pocket mounting may result in significantly less down-scattering, resulting in simpler interpretation, increased count-rates and therefore increased sensitivity to scale build-up.

Figure 7:
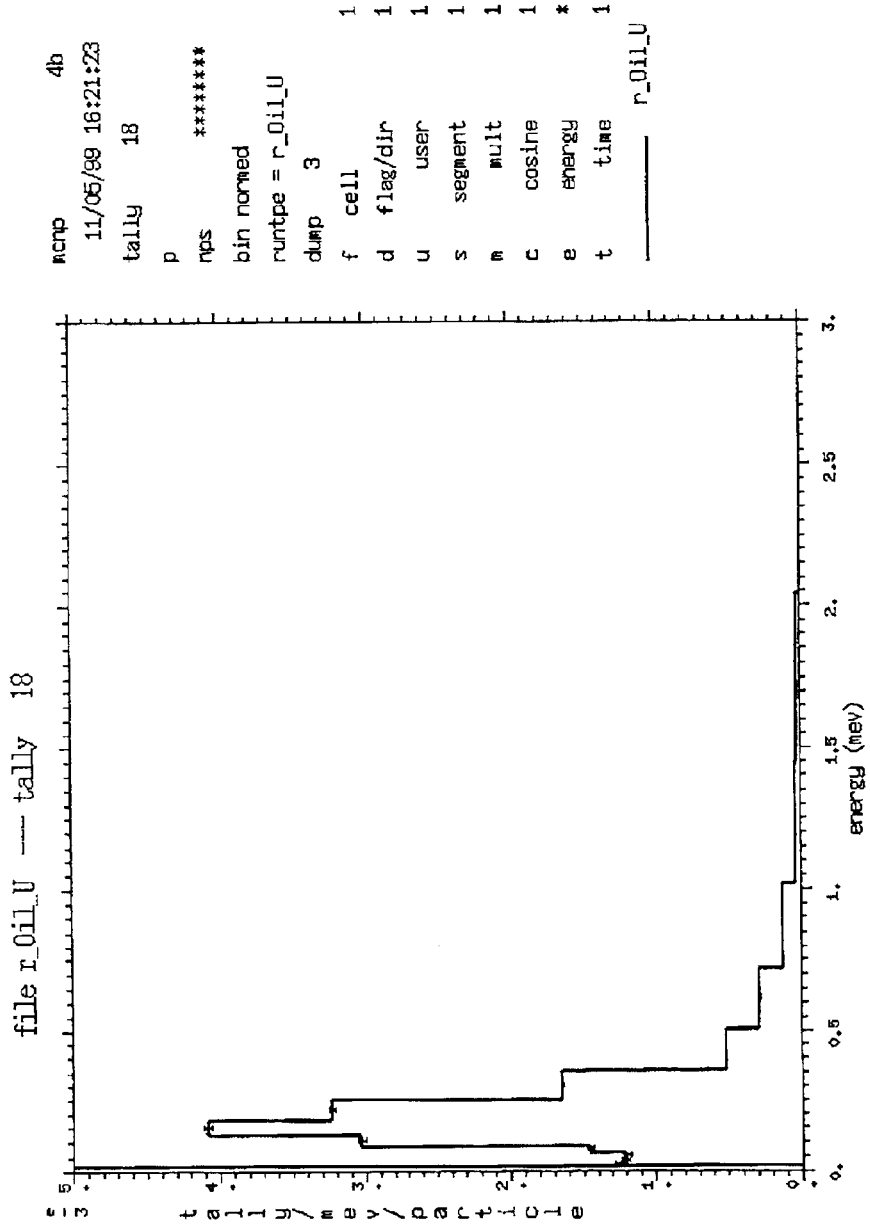
FIG. 7 shows a calculated spectrum from $^{226}$Ra (from the uranium series) in an impermeable scale, retaining all daughter products in secular equilibrium.
Figure 8:
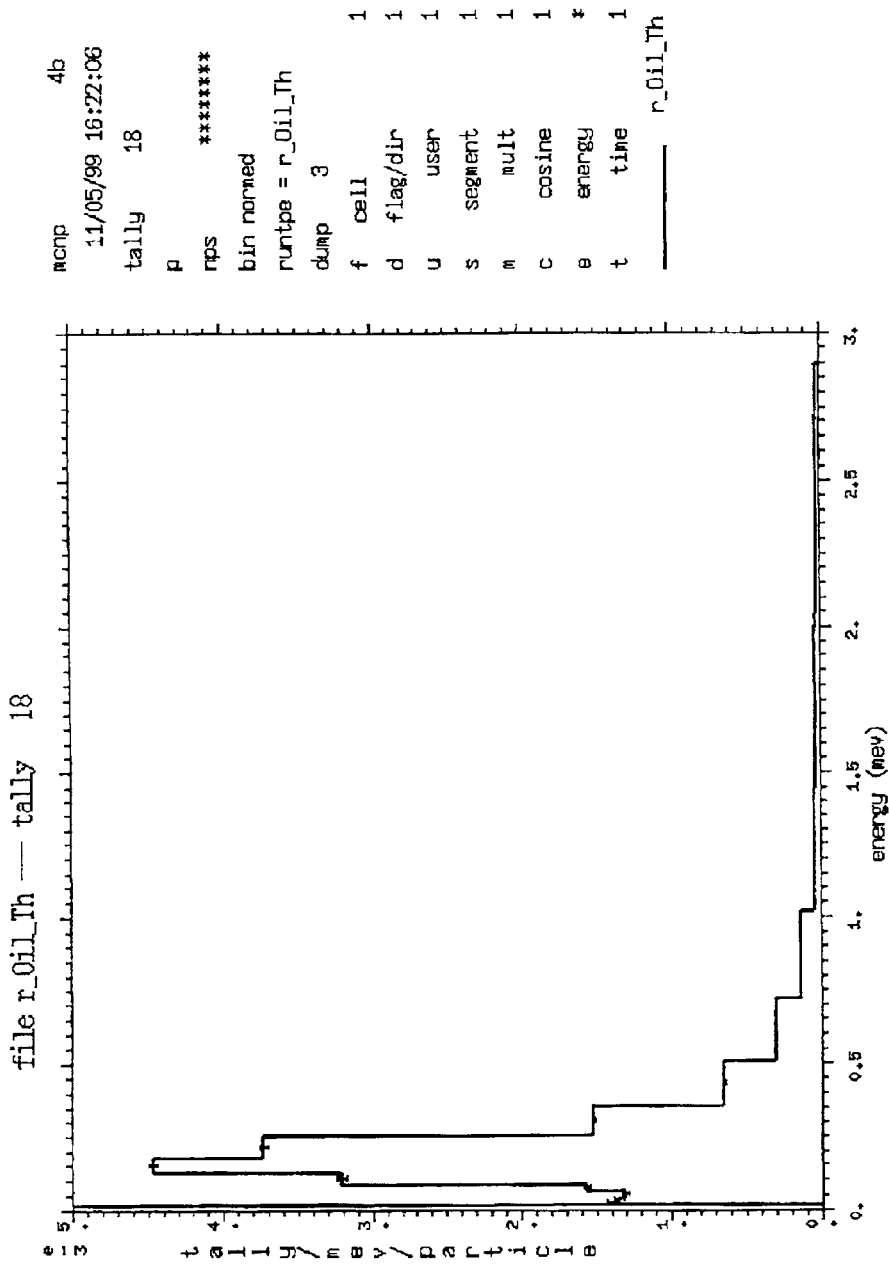
FIG. 8 shows a calculated spectrum from $^{228}$Ra (from the thorium series) in an impermeable scale, retaining all daughter products in secular equilibrium.
Figure 9:
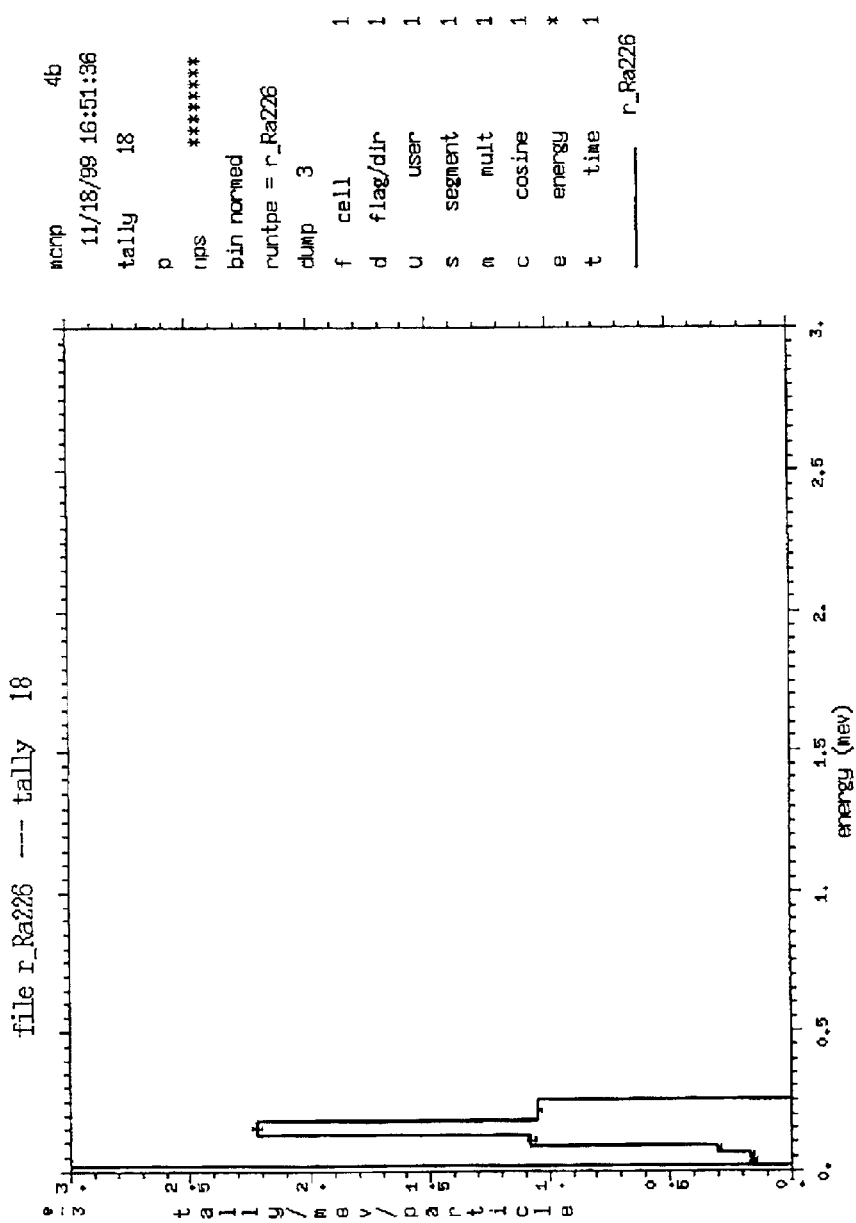
FIG. 9 shows a calculated spectrum from $^{226}$Ra, assuming that all the radon escapes from the scale before the radon can decay further.

FIG. 7 shows the calculated spectrum from $^{226}$Ra from the uranium series in an impermeable scale, retaining all daughter products in secular equilibrium. The plot shows the relative probability of detection of a gamma-ray photon as a function of the energy deposited in the detector. FIG. 8 shows a similar spectrum for scale containing $^{228}$Ra from the thorium series and its daughters in secular equilibrium. FIG. 9 shows the spectrum from $^{226}$Ra assuming that all the radon escapes from the scale before the radon can decay further.

Figure 10:
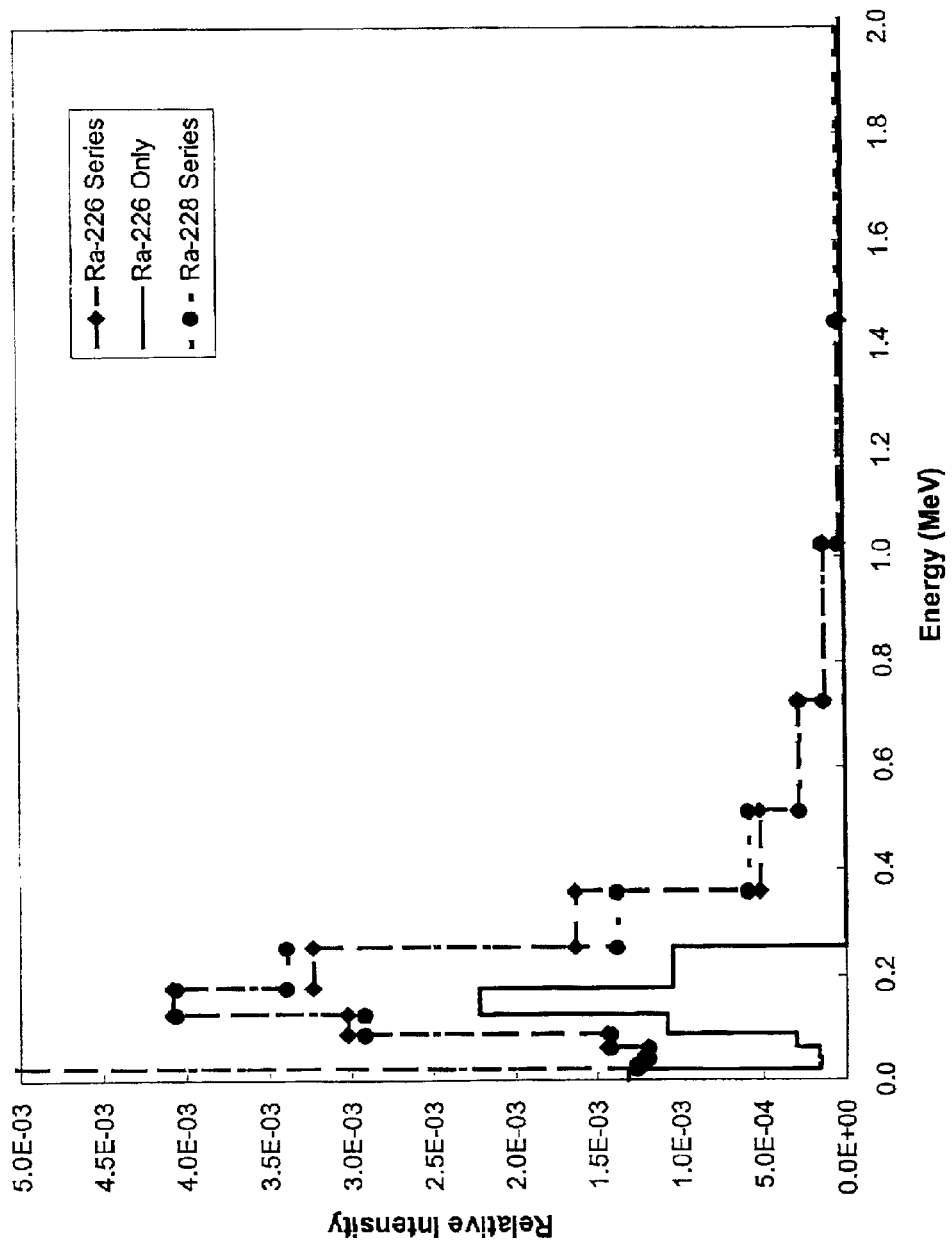
FIG. 10 shows the three spectra of FIGS. 7 to 9 on a single plot.

So even with a relatively small detector and a relatively large amount of attenuation and down-scatter, it is clear from a comparison of FIGS. 7 and 9 that the characteristic spectra are distinguishable from each other and so can provide e.g. an indication of the quantity of radon retained within the scale deposit and the $^{228}$Ra to $^{226}$Ra ratio. This is emphasized by FIG. 10 which shows the three spectra of FIGS. 7 to 9 on a single plot.

In practice, the detector usually measures a total count rate and a spectrum which is a combination of $S_U(Ra)$, $S_U(Rn)$, $S_{Th}(Ra)$ and $S_{Th}(Rn)$ according to the respective abundances. Spectral stripping is used to determine the relative contributions of three of the spectra (e.g. the three spectra of FIGS. 6 to 8) to the combined spectrum, and thence the respective abundances $a_1$ to $a_4$.

Although the specific activity and isotopic content of barium scales can vary enormously, a "typical" scale having the following properties was simulated using the Monte Carlo radiation transport simulation:

Specific activity $2 \times 10^{-3}$ μCi/g.

Ratio of $^{226}$Ra activity to $^{228}$Ra activity of 4:1.

Scale of glassy or ceramic consistency deposited in the production tubing with a thickness of 2 mm, the scale retaining all daughter radioisotopes (radon and below), so that all four spectral components $S_U(Ra)$, $S_U(Rn)$, $S_{Th}(Ra)$ and $S_{Th}(Rn)$ are observed.

The gamma-ray detector in the simulation was a 6"×¾" NaI crystal (a larger 8"×1" crystal would give count rates approximately twice as great as calculated here). It was calculated that, for this case, the count rate for gamma-rays above 50 keV is 65 cps (counts per second). Of these, 50 cps arise from $^{226}$Ra and its daughter products, and 15 cps originate in the decay chain of $^{228}$Ra. Note that, because the average total gamma-ray multiplicities (the number of gamma-rays per atom per decay) and the gamma-ray energy spectra of the two decay series are not identical, the 4:1 ratio of the isotopic decay rate is not reflected precisely in the ratio of resulting gamma-ray count rates.

An identical situation was simulated, but with the differences that (i) the scale is permeable, such that all the radon gas formed by the decay series is lost before it can decay (this is admittedly an extreme situation), and (ii) $^{226}$Ra is the predominant isotope of radium, with only negligible trace amounts of the heavier isotope $^{228}$Ra present (this is frequently observed in practice).

In this case, only gamma-rays from the decay of $^{226}$Ra are observed. These are relatively low energy and not highly penetrating. For a specific activity of $2 \times 10^{-3}$ μCi/g the simulation gives a count rate of 2.2 cps. Note that, because only $^{226}$Ra contributes to the specific activity (without its eight daughter decays in secular equilibrium), the abundance of $^{226}$Ra is nine times greater in this case than in the previous one. For a highly permeable scale with $^{226}$Ra present in the same abundance as in the first example, but no radon, the observed count rate would be only 0.2 cps.

These simulations demonstrate that for identical quantities of $BaSO_4$ scale containing the same abundance of $^{226}$Ra, we may observe gamma-ray count rates which vary by a factor of 250, depending on the permeability of the scale and therefore the degree to which radon is retained within the deposit. This illustrates the difficulty in assessing quantities of scale by gross gamma-ray counting without applying appropriate spectroscopic analysis. Such measurements can be in error by two to three orders of magnitude. The simulations also demonstrate that determination of the relative abundances of scale decay products can be used to determine the permeability of the scale. This can help well operators to plan e.g. appropriate chemical scale removal strategies.

In order to plan the implementation of appropriate disposal and safety procedures, it is desirable to assess the level of NORM activity in the installation, and again the simulations show the benefit of spectroscopic analysis. If radon is retained within the scale, the NORM specific activity is increased by a factor of nine while the gamma-ray count rate is increased by a factor of 250. The level of NORM activity determined by simple (non-spectroscopic) gamma-ray counting may therefore be in error by a factor of up to about 30. However, if spectral stripping is used to determine the relative intensities of each component of the scale gamma-ray spectra described above, a more accurate conversion from count rate to NORM activity and isotopic abundances can be applied.

Furthermore, for the above "typical" 2 mm thick impermeable scale, which retains all daughter products of radium decay and has a specific activity of $2 \times 10^{-3}$ μCi/g, a count rate of 130 cps in a larger 8"×1" detector crystal is predicted. Assuming that changes in the gamma-ray count rate of 1 cps (over appropriately long counting times) are measurable, which is reasonable, the build-up of a layer of scale of thickness 15 μm is detectable. At a density of 4.2 g/cc, this translates into a mass thickness of 6 mg/cm$^2$.

Rarely, very low activity scales with specific activities down to around $10^{-5}$ μCi/g are observed. In this case, scaling would only be detected at a thickness of 3 mm. Conversely, very high activity scales (with specific activities of up to 0.4 μCi/g) would be detected after the formation of a layer of only 0.1 μm thickness. Poorer sensitivities result if no $^{228}$Ra is present and all the radon (including daughter isotopes) promptly escapes the scale. However, this situation is rare, and in general either all daughter products are retained, or some moderate fraction escapes. Thus, for most typical activities and constitutions, we expect to be able to detect and analyse scale formations at sub-millimeter (and in some cases at sub-micron) thicknesses.

Because barium and radium are co-precipitated in a ratio close to that in which they are present in the formation water, gamma-ray spectroscopic analysis can also reveal the quantity of barium scale deposited e.g. on the wellbore wall or in formation. By measuring the concentration of barium (preferably by standard chemical means) and the concentration of radium (preferably by gamma-ray measurement techniques since levels of radium are typically too low to be detected by standard chemistry methods) in the water, the Ra:Ba abundance ratio can be measured. Thus, given the quantity of radium determined by the gamma-ray spectroscopy measurement and the measured Ra:Ba ratio, the quantity of barium in the scale can be derived, and hence the quantity of barium scale.

Figure 11:
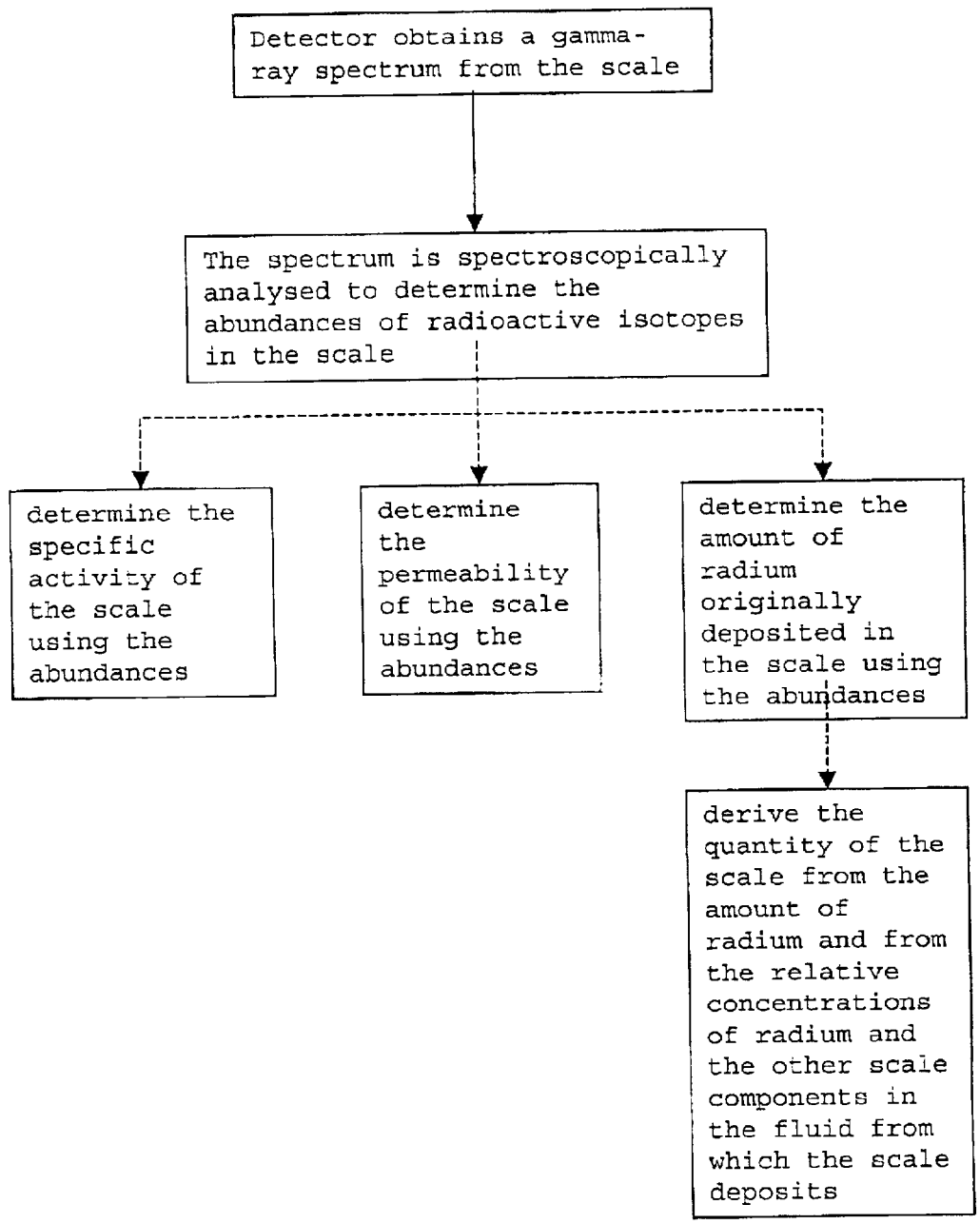
FIG. 11 is a flow chart showing the steps involved in monitoring scale development using the apparatus of FIG. 6, and optionally determining (a) the specific activity of the scale, (b) the permeability of the scale, and/or (c) the quantity of the scale.

FIG. 11 is a flow chart showing the steps involved in monitoring scale development using the apparatus of FIG. 6, and optionally determining (a) the specific activity of the scale, (b) the permeability of the scale, and/or (c) the quantity of the scale.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method of analysing scale at a location in a hydrocarbon well flow system, comprising the steps of:
    (a) using an in situ gamma-ray detector to obtain a gamma-ray spectrum from said scale;
    (b) spectroscopically analysing said spectrum to determine the abundances of radioactive isotopes including $^{226}$Ra and $^{228}$Ra and an amount of decay products of radon missing in said spectrum through migration of said radon in said scale; and
    (c) deriving the physical quantity of said scale using said abundances and a relative concentration of radium to other scale components.

2. A method according to claim 1, further comprising the step of:
    (d) repeating steps (a) to (c) to monitor the development of said scale.

3. A method according to claim 2, further comprising the step of:
    (e) using said abundances to determine the specific activity of said scale.

4. A method according to claim 3, further comprising the step of:
    (f) using said abundances to determine the permeability of said scale.

5. A method according to claim 4, further comprising the steps of:
    (g) using said abundances to determine the amount of radium originally deposited in said scale, and
    (h) deriving the quantity of said scale from said amount of radium and from the relative concentrations of radium and the other scale components in the fluid from which said scale deposits.

6. A method according to claim 5, in which the primary scale component is barium.

7. A method according to claim 1, wherein said gamma-ray detector is stationary.

8. A method according to claim 1, in which said gamma-ray detector is permanently or semi-permanently installed in said hydrocarbon well flow system.

9. A method according to claim 1, in which said gamma-ray detector is installed downhole.

10. A method according to claim 9, in which said scale is located in a well formation.

11. A method according to claim 9, in which said scale is located in the well production tubing.

12. A method according to claim 1, in which said gamma-ray detector is installed above ground.

13. A method according to claim 1, wherein in step (a) said spectrum is obtained over a time interval of at least ten minutes.

14. An apparatus for determining at least one characteristic of scale at a location in a hydrocarbon well flow system, the apparatus comprising:
    a radiation detector; and
    a signal processor, said radiation detector being adapted to (i) be installed in situ in said system, (ii) obtain a gamma-ray spectrum from said scale, and (iii) send a measurement signal encoding said spectrum to said signal processor, and said signal processor being adapted to receive said measurement signal and configured to analyse spectroscopically said spectrum to determine the abundances of radioactive isotopes including $^{226}$Ra and $^{228}$Ra and an amount of decay products of radon missing in said spectrum through migration of said radon in said scale, and to derive the physical quantity of said scale using said abundances and a relative concentration of radium to other scale components.

15. An apparatus according to claim 14, wherein said signal processor is further adapted to determine from said abundances the specific activity of said scale.

16. An apparatus according to claim 14, wherein said signal processor is further adapted to determine from said abundances the permeability of said scale.

17. An apparatus according to claim 14, wherein said signal processor is further adapted to determine from said abundances the amount of radium originally deposited in said scale and thence derive the quantity of said scale from said amount of radium and from the relative concentrations of radium and the other scale components in the fluid from which said scale deposits.

18. An apparatus according to claim 14, wherein said radiation detector is adapted to be held stationary in said hydrocarbon well flow system.

19. An apparatus according to claim 14, wherein said radiation detector is adapted to be permanently or semi-permanently installed in said hydrocarbon well flow system.

20. An apparatus according to claim 14, wherein said radiation detector is adapted to be mounted to a hydrocarbon well production tubing.

21. An apparatus according to claim 14, wherein said radiation detector is adapted to be cemented to a hydrocarbon well borehole casing.

22. An apparatus according to claim 14, which is installed in said hydrocarbon well flow system.

* * * * *